Figure 1:
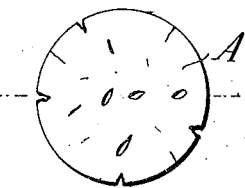

No. 872,660.  
PATENTED DEC. 3, 1907.

J. LOWMAN.  
STOPPER FOR BOTTLES, JARS, OR OTHER RECEPTACLES, AND PROCESS FOR MANUFACTURING SAME.  
APPLICATION FILED AUG. 5, 1905.

3 SHEETS—SHEET 1.

WITNESSES:  
Henry J. Suhrbier  
Fannie Fisk

INVENTOR  
John Lowman  
BY Jewell Gospel  
ATTORNEYS.

No. 872,660. PATENTED DEC. 3, 1907.
J. LOWMAN.
STOPPER FOR BOTTLES, JARS, OR OTHER RECEPTACLES, AND PROCESS FOR MANUFACTURING SAME.
APPLICATION FILED AUG. 5, 1905.
3 SHEETS—SHEET 2.
Fig.11.
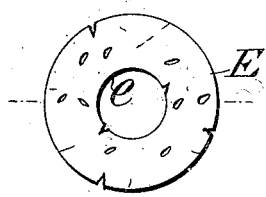
Fig.17.
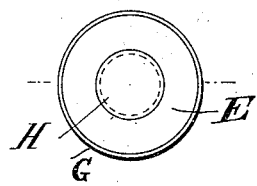
Fig.12.
Fig.18.
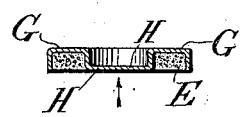
Fig.13.
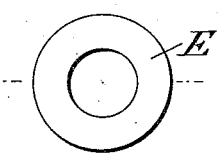
Fig.19.
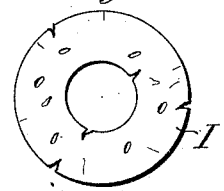
Fig.14.
Fig.20.
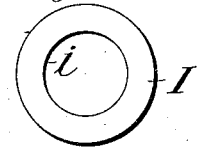
Fig.15.
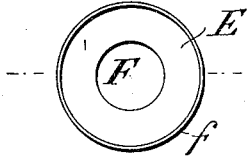
Fig.21.
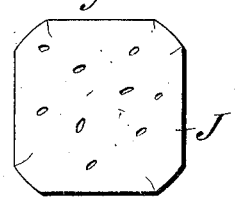
Fig.16.
Fig.22.
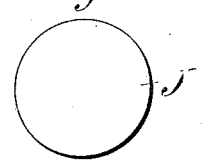
Fig.23.
Fig.24.
WITNESSES:
Henry J. Suhrbier
Fannie Fish
INVENTOR
John Lowman
BY
ATTORNEYS.

No. 872,660.  
PATENTED DEC. 3, 1907.
J. LOWMAN.  
STOPPER FOR BOTTLES, JARS, OR OTHER RECEPTACLES, AND PROCESS FOR MANUFACTURING SAME.  
APPLICATION FILED AUG. 5, 1905.
3 SHEETS—SHEET 3.
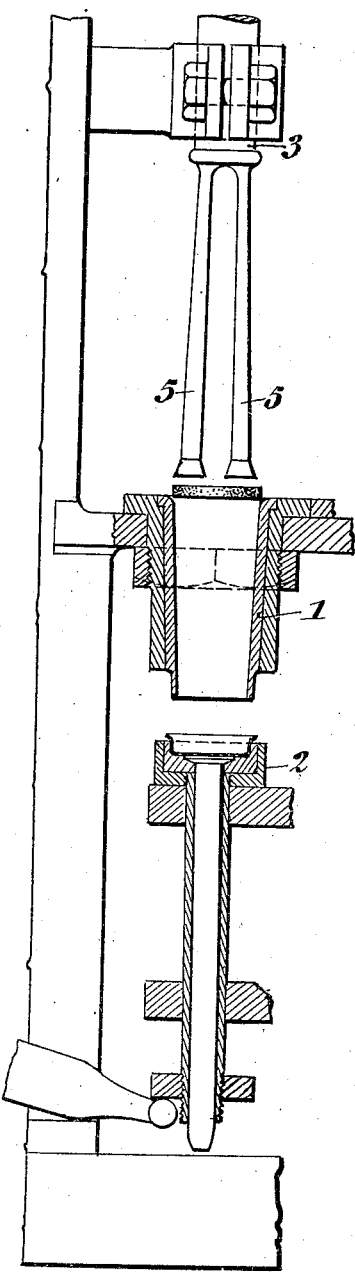
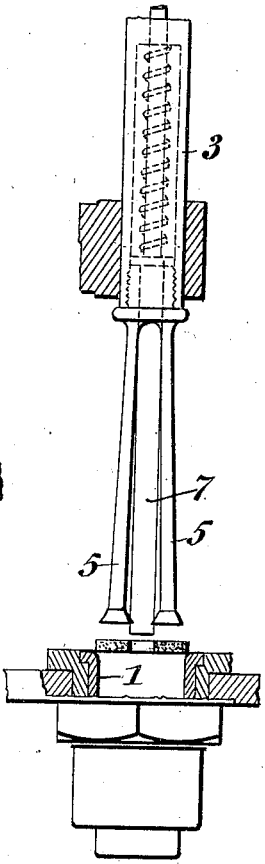
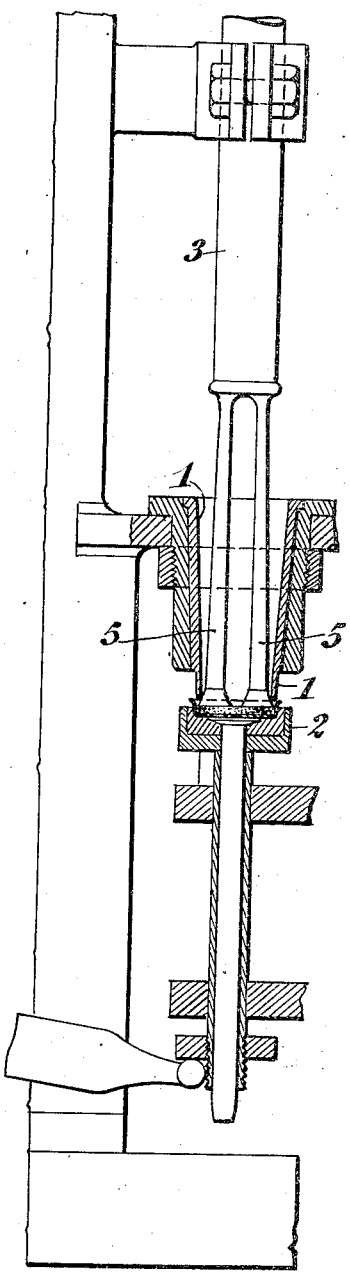
Witnesses  
Inventor  
John Lowman  
By his Attorneys

UNITED STATES PATENT OFFICE.

JOHN LOWMAN, OF LONDON, ENGLAND, ASSIGNOR OF ONE-HALF TO FRANZ JOSEF WILHELM BENDER, OF FRANKENTHAL, PFALZ, GERMANY.

STOPPER FOR BOTTLES, JARS, OR OTHER RECEPTACLES, AND PROCESS FOR MANUFACTURING SAME.

No. 872,660.    Specification of Letters Patent.    Patented Dec. 3, 1907.

Application filed August 5, 1905. Serial No. 272,900.

*To all whom it may concern:*

Be it known that I, JOHN LOWMAN, engineer, a subject of the King of Great Britain, residing at 36ᴬ Ludwick road, New Cross, London, England, have invented an Improved Stopper for Bottles, Jars, or the Like or other Receptacles and Process for Manufacturing Same, of which the following is a specification.

This invention relates to stoppers for bottles jars or the like or other receptacles.

According to this invention cork in the form of a cork disk (or disks) or cork sheet (or sheets) of any suitable shape, or cork wad or cork washer (or washers) or thin cork packing or other shallow cork layer, is first compressed laterally (*i. e.* edgewise) and is then placed, while under such lateral or edgewise compression, in caps holders capsules or covers of any suitable shape and of any suitable material (for example metal such as tin plate, aluminium, etc. or glass, china, wood, composition, etc.) and an especial object (*inter alia*) of the present invention is to put such cork under considerable compression edgewise for the purpose (*inter alia*) of getting rid of or reducing the porosity of the cork especially when said cork disks or cork sheets etc. are cut out of the cork in such manner that the grain holes or pores run through the disk or sheet more or less parallel to the short side edges of the latter.

Heretofore vertical compression has been applied to cork disks used in combination with shallow capsules or shallow caps of metal inclosing said cork disks for stoppering bottles; but according to the present invention in addition to such vertical compression considerable transverse compression (*i. e.* edgewise on the aforesaid cork) is employed and by the present invention many advantages are obtained.

For the sake of example the present invention is illustrated in the accompanying drawings and will be described as carried into practice with cork in the form of a cork disk of about an eighth of an inch in thickness.

Figure 7:
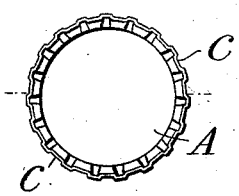
Figure 2:
Figure 8:
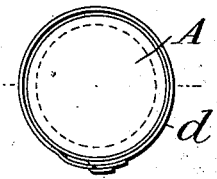
Figure 3:
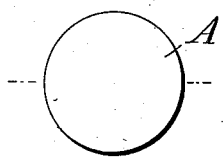
Figure 9:
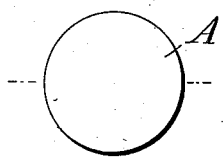
Figure 4:
Figure 10:
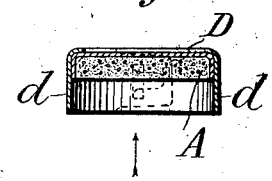
Figure 5:
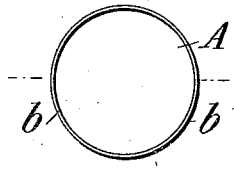
Figure 6:
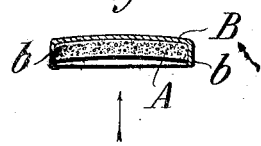

Referring to the accompanying drawings:—Figure 1 is a plan of an uncompressed cork disk *i. e.* before same has been subjected to pressure edgewise. Fig. 2 is cross-sectional view of Fig. 1. Fig. 3 is a plan of the aforesaid disk (Figs. 1 and 2) after same has been compressed and reduced to the size shown in Fig. 3. Fig. 4 is cross-sectional view of the compressed disk shown in Fig. 3. Fig. 5 shows this compressed disk A inserted in its compressed state into a plain metal cap B and Fig. 6 is cross-sectional view thereof. Fig. 7 shows this compressed disk A inserted into another form of metal cap having a crimped edge and Fig. 8 is cross-sectional view thereof. Fig. 9 shows this compressed disk inserted into yet another form of metal cap and Fig. 10 is cross-sectional view thereof. Fig. 11 is plan of uncompressed cork washer (*i. e.* before same is compressed edgewise) and Fig. 12 is cross-sectional view thereof. Fig. 13 shows this washer (Figs. 11 and 12) after same has been compressed edgewise and Fig. 14 is cross-sectional view thereof. Fig. 15 shows this compressed washer inserted while in this compressed state into a metal cap of similar type to that shown in Figs. 5 and 6 and held therein and Fig. 16 is cross-sectional view thereof. Fig. 17 shows the compressed washer inserted into another form of cap namely this cap is provided with a central mound or boss H and Fig. 18 is cross-sectional view thereof. Fig. 19 is a view of a cork washer (similar to Fig. 11) before same has been compressed edgewise and Fig. 20 shows this said washer after same has been compressed edgewise both from its outer edge and from its inner edge whereby the central opening I has been enlarged. Fig. 21 shows other than a circular piece of cork before compression and Fig. 22 shows same after it has been compressed into circular form *i. e.* as a disk. Fig. 23 is a transverse section through a cap having a lining constituted by a plurality of laterally-compressed disks of cork fitted therein, Fig. 24 is a similar section through a cap lined with a plurality of washers laid flatwise and held in laterally-compressed condition, Fig. 25 is a vertical section of an apparatus for manufacturing stoppers according to the process forming a part of the invention, Fig. 26 is a similar section of said apparatus, but showing the same at another stage in its operation, Fig. 27 is a similar view of an apparatus for manufacturing stoppers of another form, Fig. 28 is a bottom plan view of the plunger shown in Figs. 25 and 26, and Fig. 29 is a bottom plan view of the plunger shown in Fig. 27.

According to this invention the cork disk A Fig. 1 (of which Fig. 2 is a cross-sectional view showing the uncompressed cork) is compressed edgewise in such manner as to reduce its diameter or superficial area considerably and at same time produce the required shape see Fig. 3 (of which Fig. 4 is a cross-sectional view) showing the cork compressed. While said disk A is under said lateral or transverse pressure it is fitted tightly or placed into any suitable inclosing cap or holder or capsule or cover of the desired character as aforesaid and there retained (ready for use) in its compressed form; for example the cork disk A while in this compressed state may be placed either:—(a) into a shallow cap B of sheet metal having a plain annular flange $b$ as shown in underside plan in Fig. 5 and cross-sectional view thereof in Fig. 6; or (b) into a sheet metal cap such as C (Fig. 7) having the annular flange $c$ thereof crimped or corrugated or formed with a series of indentations after the manner of the metal cap used in the now well-known "crown" stopper; as shown in underside plan in Fig. 7 and cross-sectional view thereof in Fig. 8; or (c) into a deep metal cap such as D (Fig. 9) having the annular flange $d$ (of considerable depth) formed as a strap with means to buckle or fasten same after the manner of the metal cap used in the now well-known "Phœnix" stopper; Fig. 9 being an underside plan thereof and Fig. 10 a cross-sectional view.

Instead of employing a cork disk as aforesaid—a cork washer may be employed such as the cork washer E (having the central opening $e$ therein of suitable size) shown in the uncompressed state in plan in Fig. 11 and in cross-section at Fig. 12; and shown in its compressed state (i. e. after being compressed edgewise) in plan in Fig. 13 and cross-section at Fig. 14; this washer E after being thus compressed edgewise being placed in any suitable cap as aforesaid and for the sake of example is shown at Fig. 15 (of which Fig. 16 is a cross-sectional view) placed in a plain sheet metal cap F with plain annular flange $f$ similar to the cap B Figs. 5 and 6. Or if desired the cap for holding the compressed cork washer E may be provided with a central stud or boss or inset formed either out of the substance of the cap itself or otherwise as desired as for example a cap G such as shown in Figs. 17 and 18 may be employed with the central part embossed or stamped up so as to form the central mound or boss H of a size adapted to fit the central opening $e$ in the cork washer; while the circumferential flange of said cap G may either be plain as shown at Figs. 17 and 18, or may be of other suitable character such as that shown at Figs. 7 and 8 or 9 and 10.

The cork washer I, such as illustrated in Fig. 19, in addition to being compressed from its outer circumference may also if desired be compressed from its inner circumference $i$ in which case the central opening $i$ in said washer I will be expanded as illustrated in Fig. 20 which shows the cork washer I (shown uncompressed in Fig. 19) after same has been subjected to such compression upon both its inner and outer edge.

Any suitable shaped piece of cork may be employed in place of the washers E or cork disks A; for example a non-circular cork piece such as J illustrated in Fig. 21 can be compressed edgewise into a circular shaped piece forming a compressed disk J (see Fig. 22) similar to the aforesaid compressed disks A.

Instead of having the lining of the cap formed of a single piece of cork, it may be constituted by a plurality of laterally-compressed layers laid flatwise together. These layers may be in the form of disks $A^\times$, as indicated in Fig. 23; or they may be constituted by washers $E^\times$, as shown in Fig. 24.

The effect of such lateral or edge pressure upon the cork is to close or tend to close the pores or grain holes of the cork or compress or compact the cork transversely in such wise as to render the cork non-porous or practically so (especially towards the surrounding edge where it makes the closure with the bottle etc.) so that when the vertical pressure is applied to such compressed cork disk or washer etc. which is held and maintained in its compressed state in its capsule etc. thereby a very effective sealing or closure (of the bottle mouth etc.) is effected.

In carrying out the improved process for manufacturing stoppers, apparatus such as that shown in Figs. 25 to 29 is preferably used. Said apparatus comprises a conical tube 1 supported, by means such as indicated, in upright position, with its smaller end lowermost. Below said conical tube is a cup 2, designed to receive the cap into which the cork piece is to be fitted. Said cup 2 has associated therewith means for raising the same up to the lower end or mouth of the conical tube 1, as shown in Fig. 26. A plunger 3 guided vertically above said tube 1, carries at its lower end spring-arms 5 designed to move through the latter, said arms being forced radially together during their downward movement by the conical shape of the tube-bore. In order to laterally compress the cork pieces or disks and force them into the caps while they are in such compressed condition, said disks are forced downwardly and axially through the conical tube 1 by means of the plunger 3. During this operation said disks are laterally compressed by the wall of said tube, such compression being uniform throughout their peripheries. When each disk arrives at the lower end or mouth of the compressing-tube the cup 2 is raised to receive it, and the disk is then forced downwardly by the plunger into the cap held in said cup, as shown in Fig. 26, while said disk is still in laterally-compressed condition. After the disk is forced into the cap it is maintained in such condition by the circumferential flange of the latter.

As before stated, the arms 5 of the plunger, which engage the disk, are spring-arms, and during the downward movement of said plunger they are forced radially together by the wall of the compression-tube. Owing to this movement of said arms they engage the outer portion of the cork piece throughout the length of their longitudinal movement, whereby the buckling and breakage of said piece is prevented. When the arms 5 are withdrawn in upward direction from the tube 1 they spring back into their normal position.

In the apparatus shown in Fig. 27, by means of which cork washers are compressed and fitted into the caps, the plunger is provided with a central downwardly-extending mandrel 7 which passes through the aperture in the washer and supports the latter at its inner edge while it is being compressed. In this manner the washer is uniformly compressed at its outer and inner edges.

After the disk or washer of cork has been fitted in the cap as described, the cup 2 is lowered and the stopper discharged therefrom in any suitable manner.

In case a stopper such as shown in Figs. 23 and 24 is to be manufactured, the layers or washers are simultaneously or successively forced into the cap flatwise and compressed therein, after which the cap is discharged.

The material employed for forming the capsule or inclosing cap or cover for the compressed cork disk may be of any suitable sheet metal such as tin plate or aluminium or the like or other suitable material may be employed for this purpose.

While the aforesaid invention has been described as carried into practice with cork it will be obvious that not only natural cork may be employed but any suitable cork substitute may be employed if desired—for example any suitable cork composition or artificial cork may be employed in carrying out the present invention.

What I claim is:—

1. The herein described process of manufacturing stoppers from cork held in capsules caps or covers for effecting the closure of bottles jars or other receptacles which consists in compressing edgewise a piece of cork of suitable form and while in this compressed state placing same into a cap or holder which serves to retain it in this laterally compressed state and whereby it is applied in this state to the outlet to be closured.

2. The process of manufacturing bottle-stoppers, which consists in laterally compressing a piece of cork throughout its periphery, and forcing the same into a cap of such size as to maintain said piece in such laterally-compressed condition.

3. The process of manufacturing bottle-stoppers, which consists in laterally compressing a piece of cork simultaneously at all points in its periphery, and forcing the same into a cap having a flange to maintain said piece in such laterally-compressed condition.

4. The herein described process of manufacturing stoppers from cork held in capsules caps or covers for effecting the closure of bottles jars or other receptacles which consists in compressing edgewise a cork washer and simultaneously supporting the washer on its inner circumference and while in this compressed state placing same into a cap or holder which serves to retain it in this laterally compressed state and whereby it is applied in this state to the outlet to be closured.

5. The herein described process of manufacturing stoppers from cork held in capsules caps or covers for effecting the closure of bottles jars or other receptacles which consists in compressing edgewise a cork washer and simultaneously compressing the washer from its inner circumference and while in this compressed state placing same into a cap or holder which serves to retain it in this laterally compressed state and whereby it is applied in this state to the outlet to be closured.

6. A stopper for effecting the closure of bottles jars or other receptacles comprising an outer cap and a piece of cork which has been compressed edgewise and while in this compressed condition placed within said cap whereby it is held and applied while still in the aforesaid compressed state to the outlet to be closured.

7. A stopper for effecting the closure of bottles jars or other receptacles comprising an outer cap and a shallow piece of cork which has been compressed edgewise and while in this compressed condition placed within said cap whereby it is held and applied while still in the aforesaid compressed state to the outlet to be closured.

8. A stopper for effecting the closure of bottles jars or other receptacles comprising an outer cap and a layer of cork which has been compressed edgewise and while in this compressed condition placed within said cap whereby it is held and applied while still in the aforesaid compressed state to the outlet to be closured.

9. A stopper for effecting the closure of bottles jars or other receptacles comprising an outer cap and a cork washer which has been compressed edgewise and while in this compressed condition placed within said cap whereby it is held and applied while still in the aforesaid compressed state to the outlet to be closured.

10. A stopper for effecting the closure of bottles jars or other receptacles comprising an outer cap and a plurality of pieces of cork laid together flatwise which have been compressed edgewise and while in this compressed condition placed within said cap whereby same are held and applied while still in the aforesaid compressed state to the outlet to be closured.

11. A stopper for effecting the closure of bottles jars or other receptacles comprising an outer cap and a plurality of shallow pieces of cork laid together flatwise which have been compressed edgewise and while in this compressed condition placed within said cap whereby same are held and applied while still in the aforesaid compressed state to the outlet to be closured.

12. A stopper for effecting the closure of bottles jars or other receptacles comprising an outer cap and a plurality of layers of cork laid together flatwise which have been compressed edgewise and while in this compressed condition placed within said cap whereby same are held and applied while still in the aforesaid compressed state to the outlet to be closured.

13. A stopper for effecting the closure of bottles jars or other receptacles comprising an outer cap and a plurality of cork washers laid together flatwise which have been compressed edgewise and while in this compressed condition placed within said cap whereby same are held and applied while still in the aforesaid compressed state to the outlet to be closured.

In witness whereof I have hereunto set my hand in presence of two witnesses.

JOHN LOWMAN.

Witnesses:
HENRY BIRKBECK,
H. D. JAMESON.